United States Patent
Bellamy et al.

(10) Patent No.: US 11,182,600 B2
(45) Date of Patent: Nov. 23, 2021

(54) AUTOMATIC SELECTION OF EVENT VIDEO CONTENT

(71) Applicant: International Business Machines Corporation, Armonk, NY (US)

(72) Inventors: Rachel K. E. Bellamy, Bedford, NY (US); Jonathan H. Connell, II, Cortlandt-Manor, NY (US); Robert G. Farrell, Cornwall, NY (US); Brian P. Gaucher, Brookfield, CT (US); Jonathan Lenchner, North Salem, NY (US); David O. S. Melville, New York, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 14/863,505

(22) Filed: Sep. 24, 2015

(65) Prior Publication Data
US 2017/0094179 A1    Mar. 30, 2017

(51) Int. Cl.
*H04N 5/76* (2006.01)
*G06K 9/00* (2006.01)
(Continued)

(52) U.S. Cl.
CPC .......... *G06K 9/00355* (2013.01); *H04N 5/76* (2013.01); *H04N 5/91* (2013.01); *G06K 9/3233* (2013.01)

(58) Field of Classification Search
CPC .. G06F 3/04883; G06F 3/041; G06F 3/04886; G06F 3/0488; G06F 3/04842; G06F 3/0416; G06F 3/016; G06F 2203/04809; G06F 3/017; G06F 3/0414; G06F 3/0482; G06F 3/048; G06F 3/0481; G06F 3/04845; G06F 3/04847; G06F 3/0485; G06F 3/04855; G06F 1/1694; G06F 2203/04104; G06F 3/0202; G06F 19/3418; G06F 19/321; G06F 16/235; G06F 16/51; G06F 8/71; G06F 13/1689;
(Continued)

(56) References Cited

U.S. PATENT DOCUMENTS 5,821,925 A    10/1998 Carey et al.
7,219,364 B2    5/2007 Bolle et al.
(Continued)

OTHER PUBLICATIONS

Bartram et al., "The continuous zoom: a constrained fisheye technique for viewing and navigating large information spaces", Proceedings of the 8th annual ACM symposium on User interface and software technology, UIST '95, 9 pages, ACM New York, NY, USA, ©1995. ISBN:0-89791-709-X. DOI: 10.1145/215585.215977.
(Continued)

*Primary Examiner* — Eileen M Adams
(74) *Attorney, Agent, or Firm* — Peter J. Edwards

(57) ABSTRACT

A processor may record a first location at an event with at least one person. The processor may monitor a plurality of actions of that at least one person at the first location. The processor may interpret at least one action of the at least one person that indicates a change of interest to a second location at the event. Based on the at least one action, the processor may determine the second location at the event. The processor may record the second location at the event.

20 Claims, 8 Drawing Sheets

(51) Int. Cl.
  *H04N 5/91* (2006.01)
  *G06K 9/32* (2006.01)
(58) Field of Classification Search
  CPC ............ G06F 13/1694; G06F 16/2282; G06F
      16/2462; G06F 16/26; G06F 16/27; G06F
      16/9535; G06F 19/30; G06F 19/323;
      G06F 19/327; G06F 1/1613; G06F
      1/1616; G06F 1/1622; G06F 1/1624;
      G06F 1/1626; G06F 1/1632; G06F
      1/1664; G06F 1/1698; G06F 3/162; G06F
      9/30018; G06F 9/30029; G06F 9/30101;
      G06F 9/451; H04W 4/023; H04W 4/028;
      H04W 4/02; H04W 4/206; H04W 4/185;
      H04W 12/12; H04W 16/18; H04W 24/10;
      H04W 4/008; H04W 4/021; H04W 4/043;
      H04W 4/16; G05B 19/054; G05B
      2219/1109; G05B 2219/1113; G05B
      2219/15072; H04L 25/4908; H04L
      29/06027; H04L 51/063; H04L 51/22;
      H04L 65/4084; A63F 2300/69; A63F
      2300/105; A63F 13/00; A63F 13/212;
      A63F 13/211; A63F 13/213; A63F
      13/812; A63F 13/217; A63F 13/65; A63F
      13/10; A63F 13/12; G06K 9/00342;
      G06K 2009/00738; G06K 9/00711; G06K
      9/00724; G06K 9/00751; G06K 7/10297;
      G06K 9/00221; G06Q 10/08; G06Q
      10/0631; G06Q 10/06398; G06Q 10/083;
      G06Q 10/06395; G06Q 10/06315; G06Q
      30/0283; G06Q 50/06; G06Q 10/06;
      G06Q 10/10; G06Q 10/101; G06Q 30/02;
      G06Q 10/06311; G06Q 10/063112; G06Q
      10/06313; G06Q 10/0833; G06Q 10/1091
  See application file for complete search history.

(56) References Cited

U.S. PATENT DOCUMENTS

| | | | |
|---|---|---|---|
| 8,126,276 B2 | 2/2012 | Bolle et al. | |
| 8,395,656 B1* | 3/2013 | Malzbender | H04N 5/4403 348/14.08 |
| 8,477,174 B2 | 7/2013 | Michaelis | |
| 8,798,318 B2* | 8/2014 | Lavender | G06K 9/00771 382/103 |
| 9,323,379 B2* | 4/2016 | Aubauer | G06F 3/044 |
| 9,456,231 B2* | 9/2016 | Kulkarni | H04N 21/4334 |
| 10,365,732 B2* | 7/2019 | Bernstein | G06F 3/03545 |
| 2003/0080713 A1* | 5/2003 | Kirmuss | B60R 11/02 320/150 |
| 2003/0080878 A1* | 5/2003 | Kirmuss | B60R 11/02 340/936 |
| 2003/0081121 A1* | 5/2003 | Kirmuss | B60R 11/02 348/143 |
| 2003/0081122 A1* | 5/2003 | Kirmuss | B60R 11/02 348/148 |
| 2003/0081127 A1* | 5/2003 | Kirmuss | B60R 11/02 348/207.99 |
| 2006/0167847 A1* | 7/2006 | Bangel | G06Q 10/06314 |
| 2007/0022974 A1* | 2/2007 | Aebi | A01K 27/006 119/795 |
| 2007/0035524 A1* | 2/2007 | Hyatt | G06F 1/1626 345/173 |
| 2008/0091665 A1* | 4/2008 | Bangel | G06Q 10/06314 |
| 2010/0245532 A1* | 9/2010 | Kurtz | G06K 9/00711 348/14.03 |
| 2010/0306825 A1* | 12/2010 | Spivack | G06F 21/31 726/4 |
| 2011/0285807 A1 | 11/2011 | Feng | |
| 2012/0249416 A1* | 10/2012 | Maciocci | G06F 3/011 345/156 |
| 2012/0249741 A1* | 10/2012 | Maciocci | G06F 3/011 348/46 |
| 2012/0306992 A1* | 12/2012 | Watson | H04N 7/15 348/14.07 |
| 2013/0129307 A1* | 5/2013 | Choe | H04N 5/2621 386/227 |
| 2013/0147833 A1* | 6/2013 | Aubauer | G06F 3/044 345/619 |
| 2013/0182893 A1* | 7/2013 | Lavender | G06K 9/00771 382/103 |
| 2014/0095223 A1* | 4/2014 | Oxenham | G06Q 10/02 705/5 |
| 2014/0160296 A1* | 6/2014 | Kaplan | H04N 7/181 348/159 |
| 2014/0180620 A1* | 6/2014 | Hicks | G01B 11/005 702/95 |
| 2015/0012426 A1* | 1/2015 | Purves | G06Q 30/0623 705/41 |
| 2015/0221341 A1* | 8/2015 | Akay | G06K 9/00845 386/278 |
| 2015/0281166 A1* | 10/2015 | Woo | H04L 51/02 709/206 |
| 2015/0334075 A1* | 11/2015 | Wang | H04L 67/10 715/752 |
| 2015/0350848 A1* | 12/2015 | Eramian | H04W 4/04 455/404.2 |
| 2015/0358650 A1* | 12/2015 | Kulkarni | H04N 21/274 386/239 |
| 2016/0116995 A1* | 4/2016 | Wilson | G06F 3/013 345/157 |
| 2016/0337573 A1* | 11/2016 | Chan | H04N 5/23206 |
| 2016/0364025 A1* | 12/2016 | Bernstein | G06F 3/03545 |
| 2017/0054735 A1* | 2/2017 | Moretti | H04L 63/107 |
| 2017/0215770 A1* | 8/2017 | Tanaka | G08B 21/043 |
| 2017/0256073 A1* | 9/2017 | Borenstein | H04N 5/23222 |
| 2017/0300150 A1* | 10/2017 | Choe | H04N 5/2621 |

OTHER PUBLICATIONS

Cornish et al., "The Essential 20: Twenty Components of an Excellent Health Care Team", RoseDog Books, 2009, pp. 72-73. ISBN 1-4349-9555-0.

Harrenstien, K., "Automatic captions in YouTube", Google: Official Blog, posted Nov. 19, 2009, 5 pages, http://googleblog.blogspot.com/2009/11/automatic-captions-in-youtube.html.

Unknown, "The Fully Automatic, Multi-Camera System that Produces Videos Without a Crew", AutoAuditorium System for Televising Presentations, Telcordia Technologies, Inc., Copyright © 2000-2015, 3 pages, http://www.autoauditorium.com/.

Unknown, "PrimeSense", Wikipedia, the free encyclopedia, 6 pages, last modified May 22, 2015 at 22:14, https://en.wikipedia.org/wiki/PrimeSense.

Unknown, "Kinect", Wikipedia, the free encylopedia, 19 pages, last modified Feb. 26, 2015 at 20:28, https://en. wikipedia.org/wiki/Kinect.

Unknown, "Turn Meeting Rooms into Video Collaboration Hubs", Cisco TelePresence MX Series, Cisco, © 1992-2015, 3 pages, http://www.cisco.com/c/en/us/products/collaboration-endpoints/telepresence-mx-series/index.html.

Unknown, "Communicating with Computer Audio and Video", © Copyright IBM Corporation 1994, 2015, 2 pages, https://www.ujd.gov.sk/sametime/stmtghelpH_COMMUNICATING_WITH_COMPUTER_AUDIO_AND_VIDEO_4005_OVER.html.

Mell et al., "The NIST Definition of Cloud Computing," National Institute of Standards and Technology, U.S. Department of Commerce, Special Publication 800-145, Sep. 2011, 7 pages.

* cited by examiner

AUTOMATIC SELECTION OF EVENT VIDEO CONTENT

BACKGROUND

The present disclosure relates to computer systems, and, more specifically, to computer systems that facilitate the hosting, recording, and broadcasting of remote meetings, seminars, lectures, assemblies, and similar events.

Remote meeting systems typically provide the capability to record an event that may be of use or of interest to viewers who typically are not physically present during the event. These recordings may be fixed in a permanent fashion by the systems and made available to remote viewers in various forms after the event is recorded. Recordings may also be fixed in a non-permanent fashion and broadcast to remote viewers in real time or near real time.

SUMMARY

Some embodiments of the disclosure can be illustrated by a system comprising one or more computer processor circuits. The processor circuits may be configured to perform a method. As part of the method, a processor may record a first location at an event with at least one person. The processor may monitor a plurality of actions of that at least one person at the first location. The processor may interpret at least one action of the at least one person that indicates a change of interest to a second location at the event. Based on the at least one action, the processor may determine the second location at the event. The processor may record the second location at the event.

Some embodiments of the disclosure can also be illustrated by a method. In the method, a processor may record a first location at an event with at least one person. The processor may monitor a plurality of actions of that at least one person at the first location. The processor may interpret at least one action of the at least one person that indicates a change of interest to a second location at the event. Based on the at least one action, the processor may determine the second location at the event. The processor may record the second location at the event.

Some embodiments of the disclosure can also be illustrated by a computer program product comprising a computer-readable storage medium. The computer-readable storage medium may have program instructions embodied therewith. The program instructions may executable a computer to cause the computer to perform several operations. As part of these operations, a processor may record a first location at an event with at least one person. The processor may monitor a plurality of actions of that at least one person at the first location. The processor may interpret at least one action of the at least one person that indicates a change of interest to a second location at the event. Based on the at least one action, the processor may determine the second location at the event. The processor may record the second location at the event.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
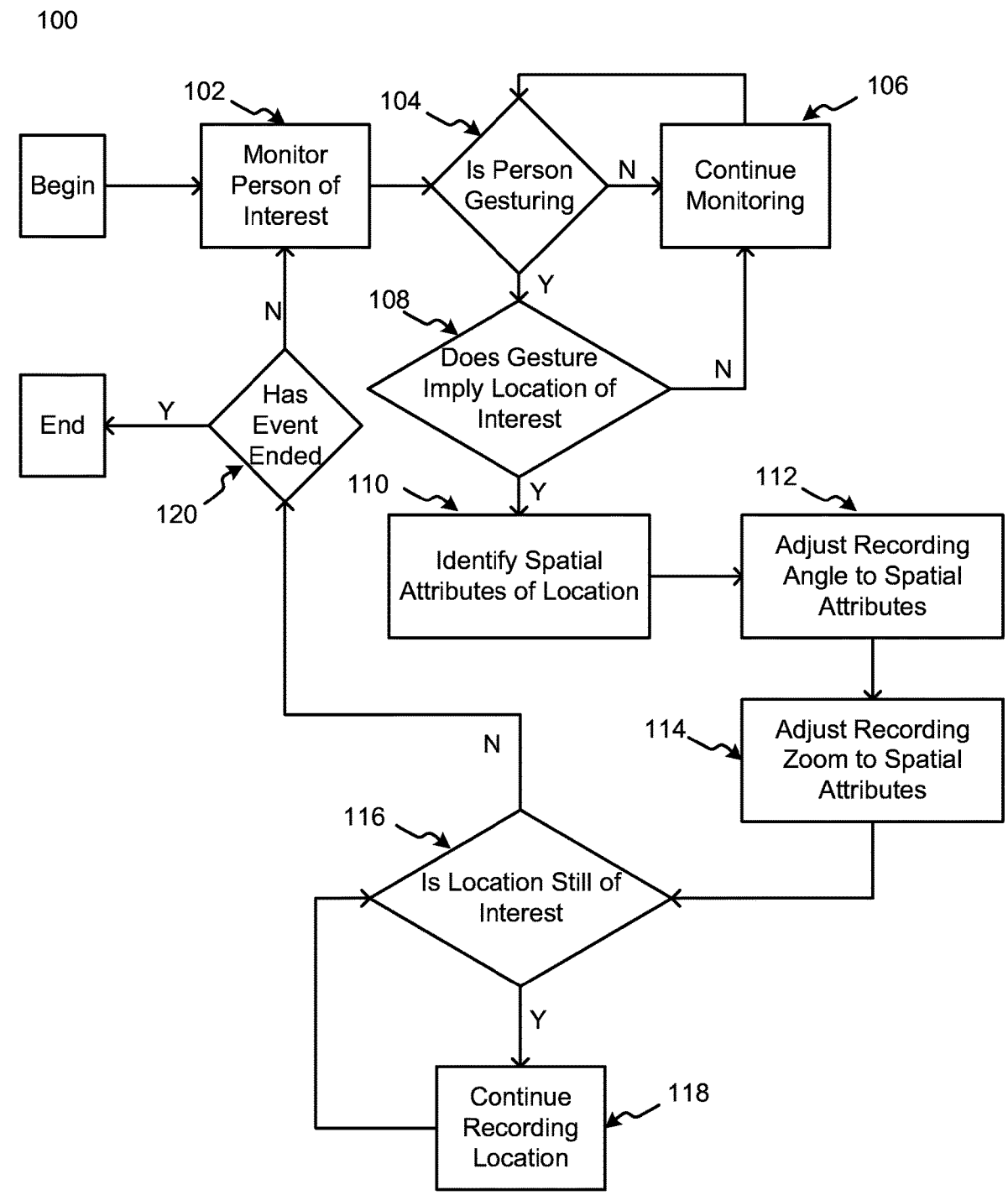
FIG. 1 depicts a logic-flow diagram illustrating a method of identifying and recording locations of interest, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Events such as seminars, lectures, business meetings, and others often have multiple stimuli in distinct locations that are of interest to viewers. Viewers of events who are able to view the content directly (e.g., in-person participants, non-remote viewers) are able to control the focus of their fields of view by turning their heads or directing their gazes towards locations of interest at the event. Indirect viewers (e.g., remote participants), on the other hand, may not be able to exert any control over the focus of the content presented. These indirect viewers include viewers who are not present at the event, who are unable to watch the event in real time, or for whom it is otherwise infeasible to observe content directly (e.g., viewers not located near the presider of a lecture or whose view of the presider is obstructed). Videos of events may be made available to indirect viewers by, for example, broadcasting a video of the event or displaying the event video on a large projection screen. However, systems that record events typically are configured to focus on a limited number of locations throughout the event, and the focus of the video at any given point may not correspond to the focus of the direct viewers. This may create a need for a system that automatically identifies and records locations of interest to be included in content made available to indirect viewers.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

In some embodiments of the present disclosure, a video-recording device, microphone, depth-sensing device, or other monitoring device or combination of monitoring devices records a person in an event. In some embodiments the act of recording may include collecting an image or other data of the person and storing the data in a non-transient storage medium, such as a disk drive, solid state drive, magnetic drive, or others. In other embodiments the act of recording may include broadcasting or transmitting the recorded data, but discarding the image immediately after.

A processor monitors the actions of the person and interprets the actions detected. If the processor interprets one of those actions as signifying a location of interest to the viewers of the event, the processor automatically arranges for that location to be recorded as well as, or in place of, the monitored person. The processor may be configured to combine the recorded images of those locations of interest into a video for the benefit of indirect viewers, thereby enabling locations on which direct viewers of the event are focused to be visible to indirect viewers of the event.

In some embodiments this combination may take the form of a video with a single focus at any given time, whereas in other embodiments the video may feature multiple locations of interest simultaneously. For example, in embodiments with multiple locations of interest featured in a video simultaneously, an image of the monitored person may be shown with one or more smaller, superimposed images of a location of interest over part of the image of the monitored person. In other embodiments the image of the monitored person may be of the same size as the image or images of the location of interest. In further embodiments the image of the monitored person may be omitted entirely (i.e., only the images of the locations of interest may be included in the video).

In those embodiments in which a video features multiple locations of interest simultaneously, the focus of the video may be interpreted as the cumulative content presented by the video at any given time. Thus, switching the focus of the video may include changing all images exhibited by the video to different locations of interest, changing only a portion of the images exhibited by the video, or adding or subtracting images of locations of interest to or from the video.

In some embodiments, a processor performs analysis of event content, as captured by a monitoring device, to identify locations of interest during an event in real time. The processor may then enable those locations to be visible to indirect viewers in the form of a video. In some embodiments, a processor or multiple processors with gesture-recognition capabilities are used to interpret gestures made by a monitored person. This monitored person may be a speaker or multiple speakers at an event; a member of the audience at a lecture, seminar, or similar event; a participant in a meeting; or another type of person at an event. In some embodiments the monitored person may be a robotic or graphical representation of a person or portion thereof that is capable of performing an action that signifies a location of interest, such as a vocalization or gesture. This may be an anthropomorphic robot, a software-rendered avatar, and in some instances a simple robotic arm.

Gesture-recognition capabilities may include facial-recognition, expression interpretation, recognition of human hands or limbs, flesh-recognition, or movement detection. In some embodiments any single such capability may be insufficient to accurately or reliably interpret gestures, and thus in these embodiments combinations of these capabilities may be used together to recognize and interpret gestures. Gestures that may signify a location of interest are also referred to as "oriented gestures," and may include pointing or otherwise directing one's hand or arm towards, nodding towards, or directing one's gaze towards (e.g., moving one's eyes or turning one's head towards) a location of interest. This should not be interpreted as a limiting list, as "oriented gesturing" may include, in some embodiments, performing any physical movement by a first person that would normally indicate a location of interest to a second person on which that second person is likely to want to focus. In most, but not all, embodiments movements such as sneezing, winking, or stretching, would not be considered to be oriented gestures, as those movements would not indicate a location of interest to a second person in most embodiments. Unless otherwise specified, it should be assumed that "gesture" and its derivations, as used herein, refer to an oriented gesture.

In some embodiments, when a gesture that signifies a location that may be of interest to viewers is detected, the location is extrapolated from that gesture and that location is recorded for the benefit of indirect viewers. In some embodiments, a processor or processors may additionally, or alternatively, feature speech-recognition capabilities that are used to interpret vocalizations made by a monitored person or other person of interest. Such a vocalization may be, for example, a discussion of a particular item presented on a projected slide show, a mention of an object on a nearby table, or the use of the name of a person present at a meeting. These vocal interpretations may be used in addition to gesture interpretations, or in the place of gesture interpretations, to identify locations of interest.

Locations of interest may contain any type of object(s), such as props, tables, text on a presentation screen, event participants (such as presenters, meeting attendees, and audience members), and others, or any portion thereof. In some embodiments, a monitored person, or a portion thereof, may be an object in a location of interest that is identified as a result of an action by that monitored person or by a different monitored person. In other embodiments, locations of interest may not contain any identifiable objects, or may contain hypothetical (e.g., intangible or otherwise imagined) objects.

In some embodiments, a processor may combine the recorded images of a monitored person and other recorded images of locations of interest into a video to be viewed by indirect viewers. In doing so, the processor may effectively increase the probability that the focus of the video content presented to indirect viewers matches the focus of direct viewers of the event. The resulting video may be broadcast to remote viewers, displayed on a presentation screen (such as a projection screen or a monitor), or stored in a database for later viewing. Some embodiments may involve multiple video-recording devices that are configured to record during the entire event. In these embodiments, the processor or processors may be configured to automatically select only the portions of the recorded images from each video-recording device that focus on a location of interest and only while the location remains of interest. In embodiments with multiple video-recording devices, the focus of the video may exhibit a single image or multiple images at any given time, as discussed previously. In some embodiments the processor may not include the image of the monitored person in the video. Rather, the video may contain only images of the locations of interest implied by the monitored person's actions.

Turning now to the figures, FIG. 1 depicts a logic-flow diagram illustrating one embodiment of a method 100 of automatically identifying and recording locations of interest based on the actions of a monitored person at an event. The method begins and, in block 102, a person is monitored. This monitored person may be, for example, a speaker in a lecture or a seminar, a presenter in a meeting, a panelist, a participant in a meeting, or a member of the audience of the above or any similar event. In some embodiments, this monitored person is recorded by a monitoring device that is transmitting the recording to a processor configured to interpret the monitored person's actions with, in this example, gesture-recognition capabilities. In some embodiments, multiple people may be monitored at the same time. For example, all of the people physically present at the meeting may be subject to monitoring for actions. In block 104 the processor analyzes the recording to determine if the person is exhibiting any recognized gestures. In some embodiments, block 104 is repeated as frequently as possible, though in practice this may be limited by processor capabilities, the frequency at which the monitoring device may record data, transmission limitations between the monitoring device and the processor, and other limitations.

If the processor determines that the monitored person is not gesturing, the processor continues to monitor the person in block 106. In some embodiments, block 106 immediately loops back to block 104, such that as long as the monitored person is not gesturing, the processor is continually monitoring the person in block 104. In some embodiments the processor may continuously monitor the person during the entire event, including when a location of interest away from the person is identified and recorded. If the processor determines in block 104 that the monitored person is gesturing, the processor analyzes the gesture in block 108 using gesture recognition to determine if the gesture is of a type that would normally indicate a location of interest to a person. If the gesture is unrecognizable or is otherwise not recognized as implying a location of interest, the processor continues to monitor the person in block 106.

If the processor determines in block 108 that the gesture does imply a location of interest, the processor attempts to identify the spatial attributes of that location in block 110. The spatial attributes of the location may be estimated based on the image of the location provided by a video-recording device. In some embodiments, these spatial attributes may include, for example, two-dimensional or three-dimensional coordinates in a coordinate structure superimposed in the event environment (similar to a blueprint or computer-animated design file of the room in which the event is taking place). Further, in some embodiments, estimates of spatial attributes may be made using a measurement system based primarily on the portion of the video-recording device's field of view that exhibits the image of an object at the location (e.g., tracking the pixels in which the image of the object is shown). In some embodiments, block 110 may involve scanning for potential objects in the perceived direction of the gesture by identifying color, luminance, or depth differentials that would, for example, indicate an object on a table or near a wall of otherwise constant color, light, or depth. In other embodiments multiple monitoring devices may be used to detect potential objects, visually or otherwise, and identify the three-dimensional coordinates of those objects using techniques such as triangulation. In embodiments in which potential locations of interest may be detected acoustically, such as a meeting room with meeting participants scattered throughout the room, the spatial attributes of the locations may be detected using microphone arrays. Potential objects may also be identified using image-recognition software, such as facial, text, or handwriting recognition, or recognition of images of common objects stored in a database. In these embodiments, spatial attributes may include the boundaries of the object's height, width, or depth, or the location of a specific point on the object (e.g., the center of the object). Alternatively, some locations may not contain an object, such as in situations in which a gesture is towards a hypothetical object. In those situations the processor may interpret the gesture based on the gesture alone, in isolation from the surrounding environment.

In some embodiments, the processor may fail to identify the spatial attributes of a location of interest that is implied by an action. In this case, the processor may be configured to continue monitoring the monitored person. In the embodiment depicted in FIG. 1, this may involve proceeding from block 110 to block 106 and continuing to monitor for future gestures.

In some embodiments, the location of interest implied by a gesture may be identified using techniques such as line-segment estimation. In line-segment estimation, a line segment is superimposed between two points chosen as reference points for a gesture, such that the first reference point is located at the proximal end of the gesture and the second reference point is located at the distal end of the gesture. A cone or similar shape is then superimposed upon the gesture such that the vertex of the cone is collocated with the second reference point, the broad end of the cone is located away from the first reference point, and the line segment between the first and second reference points would bisect the cone if extended past the second reference point. In this way the broad end of the cone extends out in the estimated direction of the gesture.

In some embodiments, any identified object within the area of a line-segment estimation cone may be considered as implied by the gesture as being at the location of interest. As the distance from the second reference point increases, the area contained within the cone increases, representing the uncertainty of the exact direction of the gesture. The rate at which the area of the cone increases (e.g., the angle of the cone) may be adjusted based on the accuracy of the gesture-recognition capabilities of the processor. A processor may be programmed to select the object that is both within the cone and is closest to the second reference point. If multiple objects are located equally close to the second reference point and within the cone, the processor may be programmed to select the object that is closest to the center of the cross-sectional area of the cone.

In some embodiments, no visual image of the superimposed line segment or cone may be created. Instead, the line segment or cone may be, for example, hypothetical structures used for calculation purposes, not visualization. In these or other embodiments the properties of the line segment or cone may differ from the examples provided above. For example, it may be beneficial in some instances to extend the line segment up to an infinite length in either direction from either point of reference. Further, the position of the cone may be shifted in any direction, or the cone may be replaced by a different shape or structure that serves a similar purpose.

Figure 2:
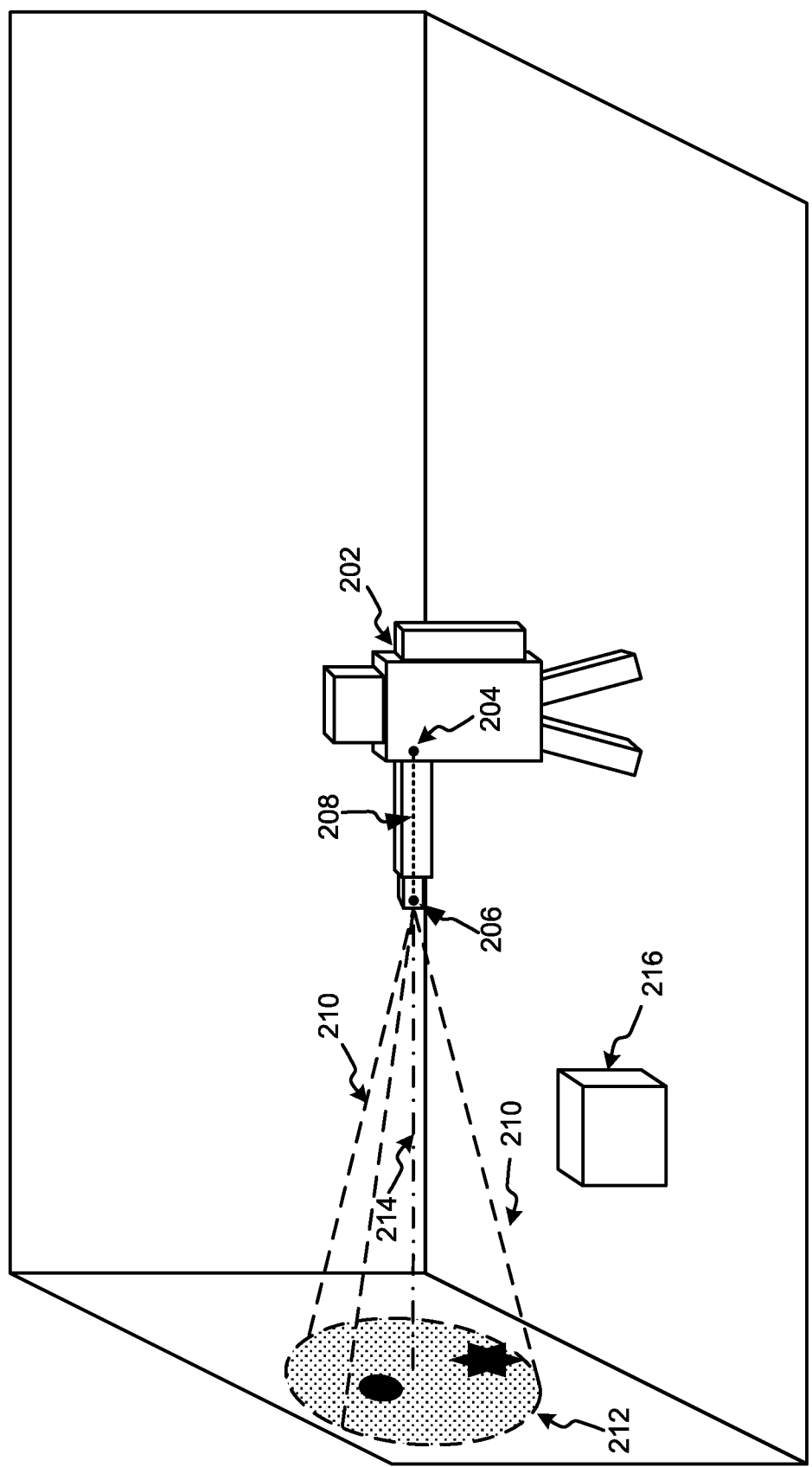
FIG. 2 depicts an embodiment of the method of FIG. 1 wherein the identifying the location of interest is implied by a gesture using line-segment estimation, in accordance with embodiments.

An example of line-segment estimation is illustrated by FIG. 2. FIG. 2 shows a Monitored Person 202 whose arm is pointing directly perpendicular to the sagittal plane of Monitored Person's 202 body such that a ninety-degree angle is formed at the shoulder joint. Upon recognizing the act of pointing as a gesture, the processor in this example establishes a First Reference Point 204 at Monitored Person's 202 shoulder joint at the vertex of the ninety-degree angle. A Second Reference Point 206 is established at Monitored Person's 202 hand or pointing finger. A Line Segment 208 (expressed here as a "dotted" line for clarity) between these points represents the approximate direction of the gesture. A cone is then superimposed near Monitored Person 202 (shown here by dashed Generatrix Lines 210 and dashed Base Perimeter 212), such that the vertex of the cone is located at the hand and a Bisecting Line 214 extending from the shoulder and through Monitored Person's 202 hand (expressed here as a line composed of dots and dashes, for clarity) bisects the cone. A processor analyzing the gesture may be configured to detect objects along Bisecting Line 214 at which Monitored Person 202 may be pointing. Box 216, while near Monitored Person 202 and the cone, would not be selected by the processor, as it is outside the area of the cone. The black circle and black star on the wall, however, are inside the area of the cone at the wall. As there are two objects mounted on the wall within the area of the cone, the processor may be programmed to select the object that is closest to the center of the cross-sectional area of the cone. In the present case, the processor would then select the black circle as implied by the gesture as being at the location of interest. In some embodiments the processor may be configured to interpret secondary actions, such as vocalizations or gazes by audience members, in order to identify the object implied by the gesture. This is illustrated in further detail in the discussion accompanying FIG. 3.

Referring again to FIG. 1, once the spatial attributes of the location are identified in block 110, a video-recording device may be adjusted to the proper angle to capture the location in block 112. This may be done in several ways. In some embodiments, the processor may identify a point that represents the center of the location, either in a coordinate-based scheme or an image-based scheme, and center the video-recording device's field of view on that point. Other embodiments involving image recognition may identify the portions of an object that are important and unimportant and angle the field of view of the video-recording device so as to capture the important portions. If, for example, an object such as a monitor displaying a slide show is being referenced, but only to draw attention to the small block of text on an otherwise black slide, the processor may identify only the block of text as the important portion of the object.

After the angle of the video-recording device is established, the zoom level of the video-recording device is established in block 114. The zoom level may refer to an optical zoom, set by changing the position of at least one optical lens, or a digital zoom, set by selecting and magnifying a portion of an image captured by at least one optical lens. In some instances this may involve magnifying the image as much as possible while maintaining a complete view of the location. In other instances the video-recording device may zoom in further to capture only the important portions of the location.

Block 114 is here shown as occurring after block 112, but in some embodiments it may be preferred to adjust the angle and the zoom concurrently. This may be preferred, for example, in instances in which only portions of an object are of interest, or in instances in which multiple locations have been identified, either as a result of a single gesture or as a result of multiple separate gestures. It may also be preferred to perform blocks 112 and 114 concurrently if it is desired to view the monitored person and the location of interest in the same field of view. This may occur, for example, if the monitored person is a presenter at a meeting or lecture and the location of interest is a projection screen to which the monitored person is referring, or if the location of interest is a second person with whom the monitored person is speaking.

In some embodiments the processor may adjust the recording angle and zoom level in blocks 112 and 114 of the same monitoring device that provided the recording with which the processor monitored the person in block 102 and identified the spatial attributes in block 110. In other embodiments, however, a different type of monitoring device, such as a depth-sensing device, may monitor the person and provide the recording data to the processor. Further, in some embodiments multiple video-recording devices may be used to provide image data of the location of interest for a video. Multiple video-recording devices may be beneficial, for example, to minimize the amount of time necessary to adjust video-recording-device angle and zoom level. Further, multiple video-recording devices may be preferred based on the nature of the event. This may be true for events in which multiple simultaneous locations of interest are anticipated, such as events with multiple presentation screens on opposite ends of the event room or with several props; events in which it is likely that the monitored person will be engaging in conversations with several members of the audience, such as lectures or seminars; or events in which it is difficult to capture all possible locations of interest from one position, such as large event spaces with complex arrangements.

In embodiments with multiple video-recording devices, there may be multiple video-recording devices that are capable of providing image data of a location of interest. In these embodiments the processor may be configured to select the most desirable video-recording device to record the location of interest for an event video. For example, the processor may select the video-recording device that is most capable of obtaining the viewing angle that is most similar to that of the monitoring person, that is the closest to the location of interest, that has the least obstructed view of the location of interest, or others.

Once the viewing angle and zoom are set in blocks 112 and 114, the processor determines whether the location remains of interest in block 116. This may be performed in various ways. For example, in some embodiments a location may be of interest as long as the monitored person is continually gesturing towards the location, such as when the monitored person is a speaker who is pointing towards a location of interest for an extended period of time, or when the monitored person is an audience member who is continually gazing towards a location of interest. In other embodiments the object at the location may be of interest because it performs an action (such as a product demonstration) and may no longer be of interest after the action is performed. In embodiments in which a discussion or lecture focuses on objects as they are relevant, the processor may use speech recognition to detect when the object at the location is no longer relevant. Finally, in embodiments without any clear indicator of relevance, a timer may start each time a location is identified by a gesture, at the end of which timer the video-recording device would cease recording the location of interest. Similarly to block 104, it may be preferred to perform block 116 with as high of a frequency as possible.

In some embodiments, the processor proceeds to block 118 if it determines that the location remains of interest. At block 118, the processor continues to record the location of interest, and loops back to 116. As has been discussed previously, the act of recording may involve fixing the image to a non-transient storage medium, or broadcasting or transmitting the image and discarding it. Similar to blocks 104 and 106, it may be preferred for blocks 116 and 118 to cycle continuously, as quickly as possible or at a predetermined interval of time as long as the location remains of interest. While in FIG. 1 blocks 110, 112 and 114 are depicted as occurring before block 116 and 118, in some embodiments they may be repeated at any point at which the processor determines that the location is still of interest. This may be beneficial, for example, in embodiments in which an object is originally at the location of interest, but begins moving while the location is still of interest (e.g., if the object is a person or animal on a stage or a prop that is part of a demonstration).

If the location is no longer of interest, block 116 will proceed to block 120, at which point the processor may instruct the video-recording device to cease recording the location. More specifically, at block 120 the processor determines whether the event has ended. This may be determined, for example, by detecting a certain percentage of monitored persons or non-monitored persons (e.g., meeting participants or audience members) leaving the event area. If the event has not ended, the processor loops back to block 102. If the event has ended, the processor terminates method 100. In some embodiments the processor may not be configured to perform block 120, in which case block 116 may proceed to block 102 if the processor determines the location is no longer of interest. In such embodiments, method 100 may loop continuously until a user determines that the event has ended and manually terminates the method.

In embodiments with more than one video-recording device, some video-recording devices may be configured to record continuously, up to recording throughout the entire event. In such embodiments, the processor or processors may, in response to actions of a monitored person, determine the video-recording devices from which data is to be used in a video for the benefit of indirect viewers (e.g., broadcast to remote viewers, projected on a screen for non-remote indirect viewers, or saved in a video file or otherwise fixed in a medium for later viewing).

It is important to note that, while physical gestures are monitored and used to identify locations of interest in connection with some embodiments described in reference to FIG. 1, in other embodiments other actions, such as vocalizations, may be monitored and used to achieve the same purpose.

While FIG. 1 exhibits only one action upon which a location of interest is identified, in practice there may be more than one action available that implies a location of interest. In some instances two or more actions may imply the same location of interest, in which case that location may be recorded following the same process illustrated by FIG. 1. In some embodiments, the video-recording device may be prevented from recording a location unless two or more actions imply the same location of interest in a set amount of time, thereby preventing false-positive conclusions of locations of interest or switching between locations of interest faster than viewers may be able to follow. In other instances two or more simultaneous or near-simultaneous actions may imply different locations of interest, in which case one sole location may be recorded, each location may be individually recorded in a sequence, or all locations may be recorded simultaneously by the same or multiple video-recording devices. In yet other embodiments, a first action may imply a location of interest, and subsequent actions may imply an object at that location or a portion of that location with more specificity than the first action alone.

Figure 3:
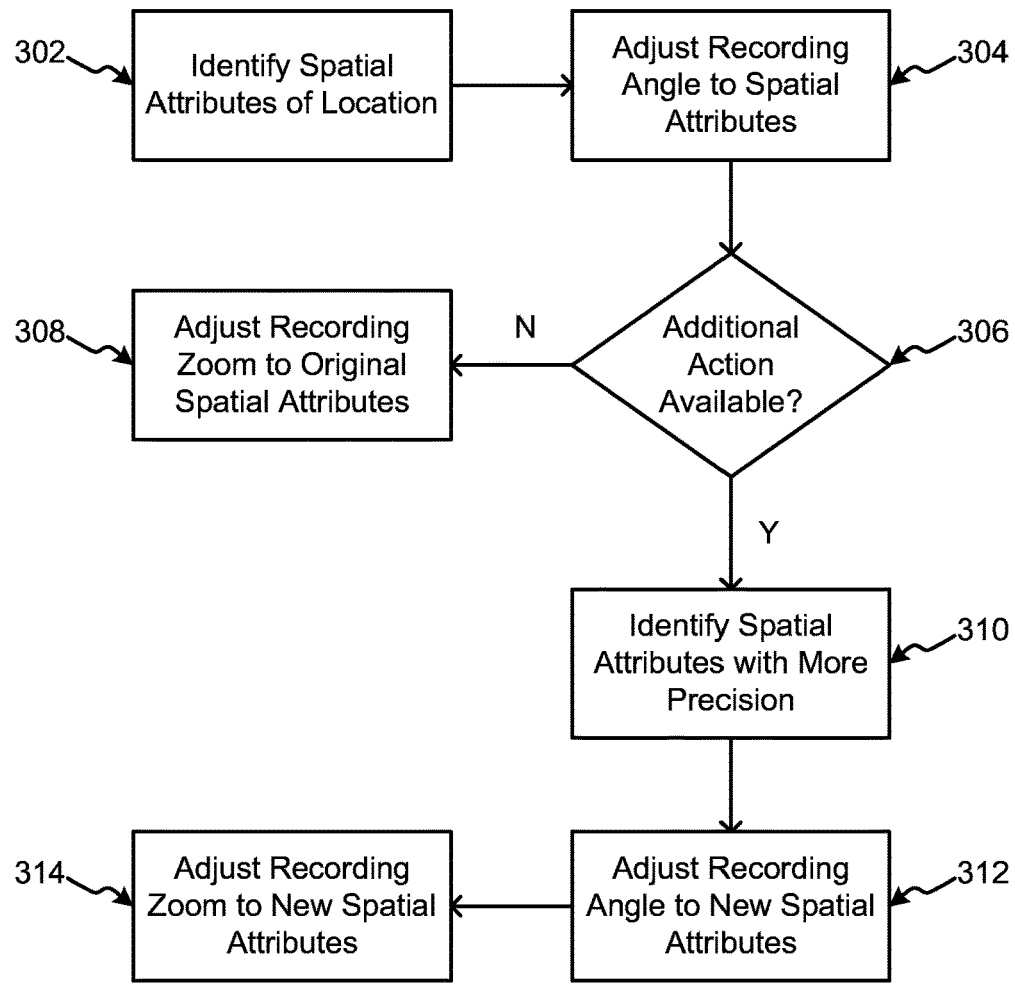
FIG. 3 depicts a logic-flow diagram illustrating an embodiment of the disclosure in which multiple actions are used to refine the identification of locations of interest.

An embodiment illustrating a method 300 of interpreting multiple actions is shown in FIG. 3. In some embodiments, the method 300 begins after a location of interest is identified by a process similar to the process illustrated by blocks 102-108 of FIG. 1. In block 302, the processor identifies the initial spatial attributes of a location of interest based upon a monitored action. The angle of the video-recording device is adjusted to correspond to those spatial attributes in block 304. In block 306 the processor determines whether an additional action is available to identify the spatial attributes of that location of interest with more precision. In some embodiments this additional action may not be performed by a person (i.e., a human stimulus), but may be a non-human stimulus during the event (e.g., a door slamming, an item falling off a table, a bird flying in the event space, or an animated prop during a presentation). If an additional action is not available, the processor sets the zoom level in block 308 to the spatial attributes that were identified based on the first action (e.g., in block 302). If an additional action is available, the spatial attributes of the location of interest are identified with more precision in block 310 based on that additional action.

In some embodiments, monitoring additional actions may be helpful in improving precision of focus. For example, if a monitored person points towards a projection screen that displays two images, it may not be apparent to which of the two images the monitored person is actually pointing. This may occur, for example, because both images fall within the area of a cone superimposed during line-segment estimation, and both images are equally close to the center of the cone. Thus, with the initial action only the spatial attributes of the two images combined are identifiable. However, if the monitored person incorporates a second action, such as a vocalization clarifying "the image on the left," the spatial attributes of the location are identifiable with more precision by interpreting that vocalization with speech-recognition software.

This may be illustrated by referring again to FIG. 2. If Monitored Person 202 were gesturing as shown and no further actions were available, a processor may identify the black circle as the subject of the gesture. However, if the processor also detected Monitored Person 202 vocalizing "that star over there," the processor may select the black star instead. The same conclusion may be drawn if the processor detected Monitored Person 202 or another monitored person gazing directly at the star shortly after the gesture. In a slightly different example, the particular image to which the monitored person is pointing may be apparent by the initial action alone, but a vocalization may still be used to identify the precise portion of the particular image that is of interest. If, for example, the black star were larger and occupied the entire area encircled by Base Perimeter 212, and the processor detected Monitored Person 202 vocalizing "the top of that star over there," the processor may only select the top section of the star as a location of interest.

Referring again to FIG. 3, once the spatial attributes of the location of interest are identified with more precision in block 310, the angle of the video-recording device may be adjusted to correspond to these new spatial attributes in block 312. The zoom level of the video-recording device may be likewise adjusted in block 314.

It is important to note that in some embodiments block 306 may occur before blocks 302 and 304. This may be the case, for example, in instances in which the spatial attributes of the location of interest cannot be determined based on the initial action. There may also be time-saving or other benefits of analyzing additional actions before the recording-device angle and zoom level are initially set. Finally, in some instances it may be desirable to repeat blocks 306 and 310-314 for subsequent additional actions.

In a further example, the additional action or actions may not be performed by the initial monitored person, but instead by an additional monitored person. More specifically, if a meeting were occurring during which an initial monitored person was expressing criticism to "John," but it was not apparent from that initial person's actions who "John" was, the gazes of the other persons in the meeting could be tracked, and the person at whom those gazes are directed would likely be "John." In this example, the initial monitored person's critiques of John would be the initial action, and the gazes of the other monitored persons in the meeting would be the additional actions.

Figure 4:
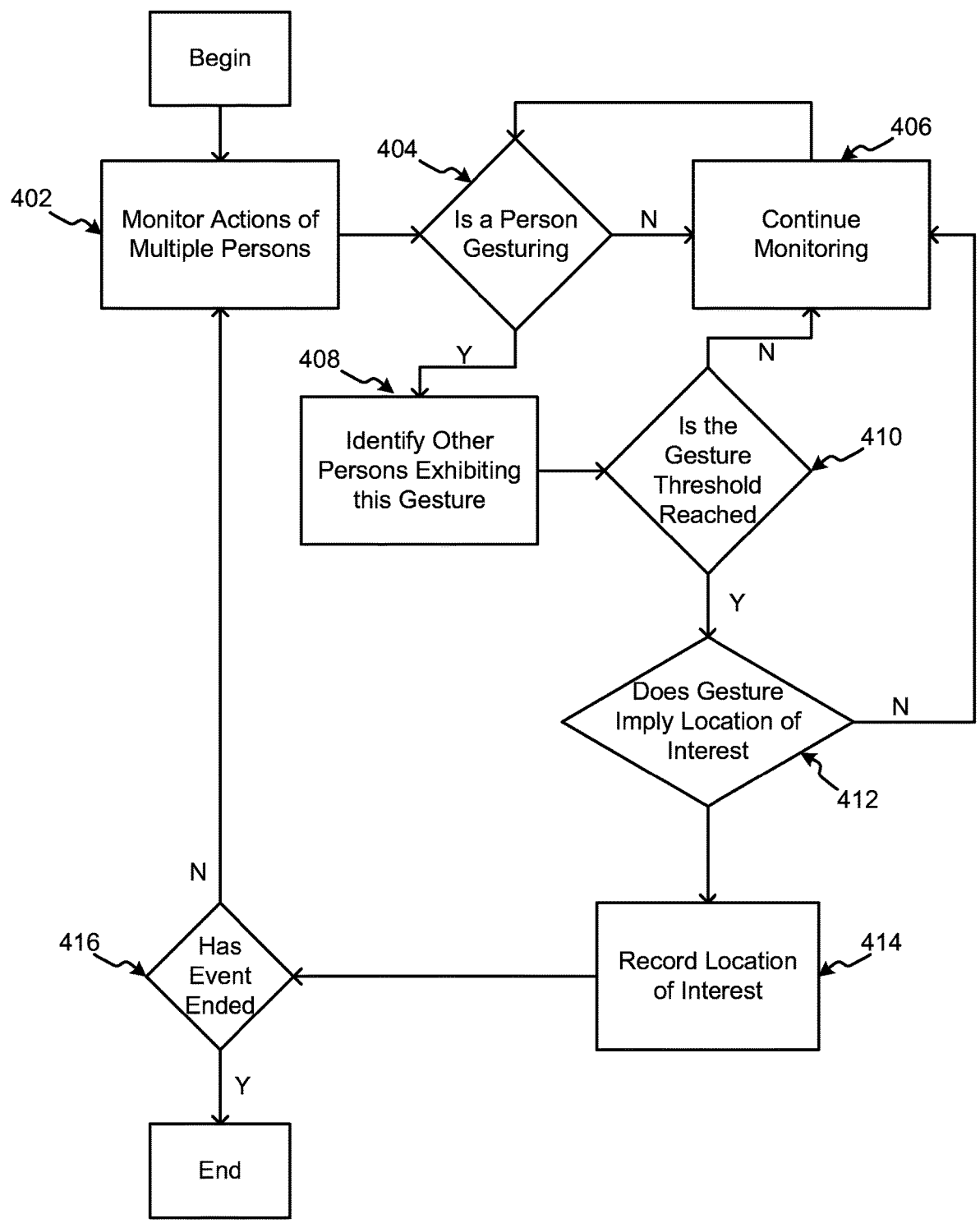
FIG. 4 depicts a logic-flow diagram illustrating an embodiment of the disclosure in which the actions of multiple persons are interpreted.

Referring now to FIG. 4, a flowchart of a method 400 of interpreting actions of multiple persons is shown in accordance with embodiments. In some embodiments, the method 400 may be useful to identify locations of interest in instances in which an action of an initial monitored person is either undiscernible or undetected. In block 402, a processor with gesture-recognition capabilities monitors the actions of multiple persons by, for example, analyzing a recording of those persons. For the purposes of this explanation it is assumed that these persons are members of an audience at a presentation or meeting, but any other group of persons may be monitored by the method 400 in some embodiments. In block 404 the processor determines if any of the monitored persons are gesturing. If the processor determines that the persons are not gesturing, the processor continues to monitor the persons in block 406. In some embodiments, block 406 immediately loops back to block 404, such that as long as the persons are not gesturing, the processor is continually monitoring the persons in block 404.

If the processor does detect that one of the monitored persons is gesturing in block 404, it attempts to identify the same or a similar gesture among the remaining monitored persons in block 408. This block may be absent in some embodiments, but may be useful in order to avoid detecting false-positive locations of interest that may otherwise be prevalent when tracking the actions of many audience members. For example, a gesture interpreted as pointing at a location of interest may actually be a person stretching if it is only performed by one audience member. Further, a gesture interpreted as gazing at a location of interest may actually be glancing about the room due to lack of attention if it is only performed by one audience member.

At block 410 the processor determines whether the number of persons identified as exhibiting the gesture in block 408 is above a set threshold. If the threshold is not reached, the processor proceeds to block 406. If the threshold is reached, the processor proceeds to block 412. This threshold check may also be useful for avoiding the detection of false-positive locations of interest, but may be absent in some embodiments. For example, some embodiments may direct block 408 to either block 406 or 412 directly, or both blocks 408 and 410 may be absent, in which case block 404 may be directed to block 406 or 412 directly. In some embodiments, it may be preferred to exclude certain actions, such as continuous vocalizations, from blocks 408 and 410. In this way a single monitored person performing the action of asking a question, for example, may still be identified as a location of interest.

In block 412, the processor determines whether the gesture or gestures performed by the monitored persons imply a location of interest. In the example illustrated here, these gesture or gestures may be turning one's head to look towards a location of interest, but are not limited to any particular gesture. If the gesture does not imply a location of interest, or if that location cannot be discerned, the processor proceeds from block 412 to block 406. However, if a location of interest is implied, the processor proceeds to record the location of interest in block 414. This act of recording may entail adjusting the recording angle and zoom angle. The recording may further entail a determination of whether the location is still of interest, which may occur through methods similar to those already discussed in connection with FIG. 1. The resulting recording may be broadcast to remote viewers or displayed for the benefit of indirect viewers as a video, or saved as a video file for later viewing.

After the processor records the location of interest, it proceeds to block 416, at which point it determines whether the event has ended. This may be determined, for example, by detecting a certain percentage of monitored persons or non-monitored persons (e.g., meeting participants or audience members) leaving the event area. If the event has not ended, the processor loops back to block 402. If the event has ended, the processor terminates method 400. In some embodiments the processor may not be configured to perform block 416, in which case block 414 may proceed to block 402 if the processor determines the location is no longer of interest. In such embodiments, method 400 may loop continuously until a user determines that the event has ended and manually terminates the method.

While physical gestures are discussed herein for the ease of understanding, it is contemplated that in some embodiments of method 400 vocalizations of multiple persons may be tracked to identify locations of interest. For example, where a threshold number of audience members are speaking during a lecture, it may imply audience participation or dissent, and record the audience accordingly. Similarly, if the monitored persons are participants at a meeting, and a sufficient number of persons are speaking independently such that the aggregate speech is unrecognizable by the processor, or such that the processor recognizes a sufficient amount of seemingly unrelated discussions, it may signify a break or commotion in the meeting. In this case, the location of interest may be the location of the commotion, or the entire meeting room.

In some embodiments it may be beneficial to identify potential locations of interest before those locations are referenced, pointed to, or otherwise implied by an action during an event. Identifying potential locations of interest in advance may, for example, save time when a location is implied by an action, as the spatial attributes and corresponding video-recording-device angle and zoom level may already be determined. This may allow, in some embodiments, corresponding method blocks (such as those associated with zooming) to be skipped. In embodiments with actions by a monitored person that are difficult to interpret or with poor real-time object recognition, identifying potential locations of interest in advance may aid in identifying the particular locations of interest implied by an action during an event. Further, facial recognition software could be used in some embodiments to identify the locations of known participants in a meeting, allowing those participants to be recorded immediately upon being referenced in a vocalization by a monitored person. Potential locations of interest could be identified in advance by a monitoring device connected to a processor configured to recognize objects at those locations. Object recognition could be performed by any method previously discussed or any similar methods. Further, potential locations of interest may be stored by manual entry of the locations of objects by a user.

Figure 5:
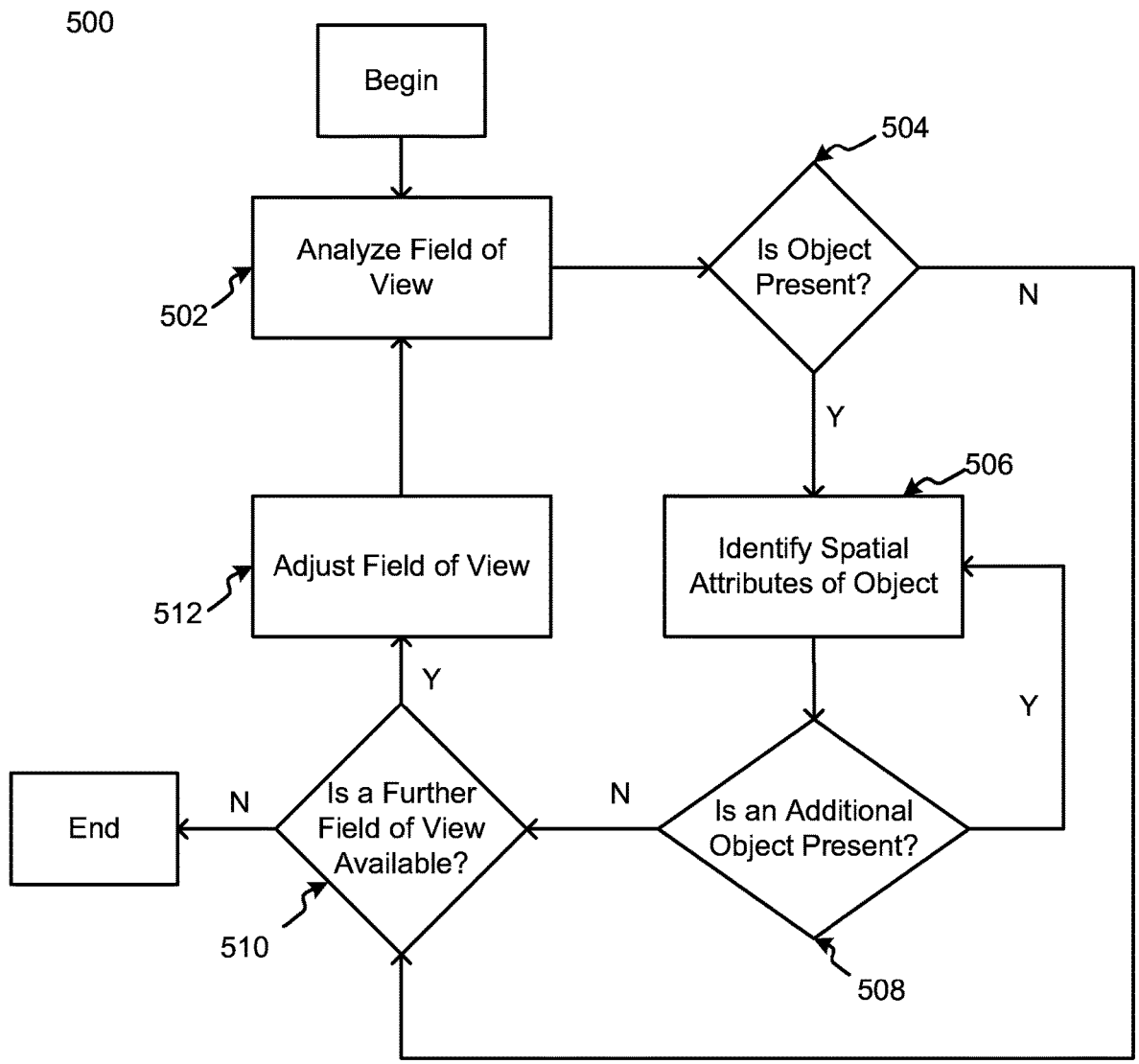
FIG. 5 depicts a logic-flow diagram illustrating an embodiment of the disclosure in which potential locations of interest are identified prior to an event.

FIG. 5 illustrates an embodiment of a method 500 by which locations of interest may be identified prior to an event by analyzing objects in the event area. To begin, a processor analyzes the field of view of a video-recording device in block 502. In block 504 the processor determines, typically using previously discussed methods of object recognition, whether an object is present in that field of view. If an object is present, the processor identifies the spatial attributes of the object in block 506. In some embodiments the processor may be configured to retain the spatial attributes in a memory or storage medium for later use during an event. Once the object's spatial attributes have been identified, the processor determines whether an additional object is present in the field of view in block 508. If an additional object is present, the processor identifies the spatial attributes of that additional object in block 506, after which it again proceeds to block 508. If the processor determines in either blocks 504 or 508 that no object is present, the processor determines whether a further field of view is available for the video-recording device in block 510. (e.g., if the video-recording device is capable of pan, tilt, and zoom functionalities, the processor may determine whether all angles of view of the video-recording device have been analyzed or whether the zoom level of the video-recording device may be reduced). If the processor determines that a further field of view is possible, the processor adjusts the video-recording-device field of view in block 512, and begins the method again at block 502 with that new field of view. If the processor determines that there is no further field of view available in block 510, the processor terminates method 500.

In embodiments in which potential locations of interest are identified before a meeting, each potential location of interest may have a dedicated video-recording device in addition to the monitoring device that is used to monitor the monitored person. If the recording angle and zoom level of each video-recording device are also configured in advance, activating a video-recording device to record a location of interest could be performed very quickly; once a location of interest is identified, the processor could instruct the corresponding video-recording device to begin recording at the already-adjusted angle and zoom level.

In some embodiments of the methods discussed in this disclosure, it may be preferred to prevent multiple rapid changes in what is being presented to indirect viewers (i.e., changes in the focus of the video compiled for those viewers) in order to avoid overstimulating those viewers. This could be performed, for example, by establishing a minimum dwell time, (i.e., the amount of time between when (1) the processor changes the focus of a video and (2) the processor may change the focus of the video again). This could also be performed by tracking the gazes of any present audience members or other participants, and only recording a new location when a sufficient number of those audience members or other participants direct their gaze to the new location. Doing so may also ensure that only particularly interesting locations are recorded.

In some embodiments the recorded images of the monitored person may be included in the video, enabling indirect viewers to track the monitored person's actions and anticipate resulting changes of video focus. This may be beneficial, for example, in events in which it is anticipated that preventing rapid changes of video focus would detract from indirect-viewer comprehension. In other embodiments, the processor may omit recorded images of the monitored person from the video and instead include only images of identified locations of interest. This may be beneficial, for example, to preserve sufficient image clarity when multiple locations of interest are shown in the video or when video resolution is limited.

In some embodiments, the video that is produced by the processor may be completely composed of recorded images captured by the video-recording devices. In other embodiments, however, the processor may select non-recorded content to represent locations of interest. If, for example, the location of interest is a selection of text that is being presented on a projection screen at a meeting, it may be more beneficial to include an image of the text directly from the source file, rather than recording an image of the screen with a video-recording device. Further, there may be instances in which there is no object at a location of interest, yet the monitored person is referencing a hypothetical object. In those instances, the processor may include a recording of the location of interest with a rendered image that is representative of the hypothetical object in the video.

In embodiments in which the video produced by the processor is to be broadcast to remote viewers, it may be beneficial to select the resolution and framerates of the broadcast video based on the content of the video. For example, while the only content being broadcast is a recording of an inanimate object at a location of interest, the processor may broadcast the video at a high resolution and low framerate, making it more likely that the visual details of the object will be apparent to remote viewers. However, if the only content being broadcast is a meeting participant, the processor may broadcast the video at a low resolution and high framerate, making it more likely that remote viewers will be able to track the participant's body language.

Figure 6:
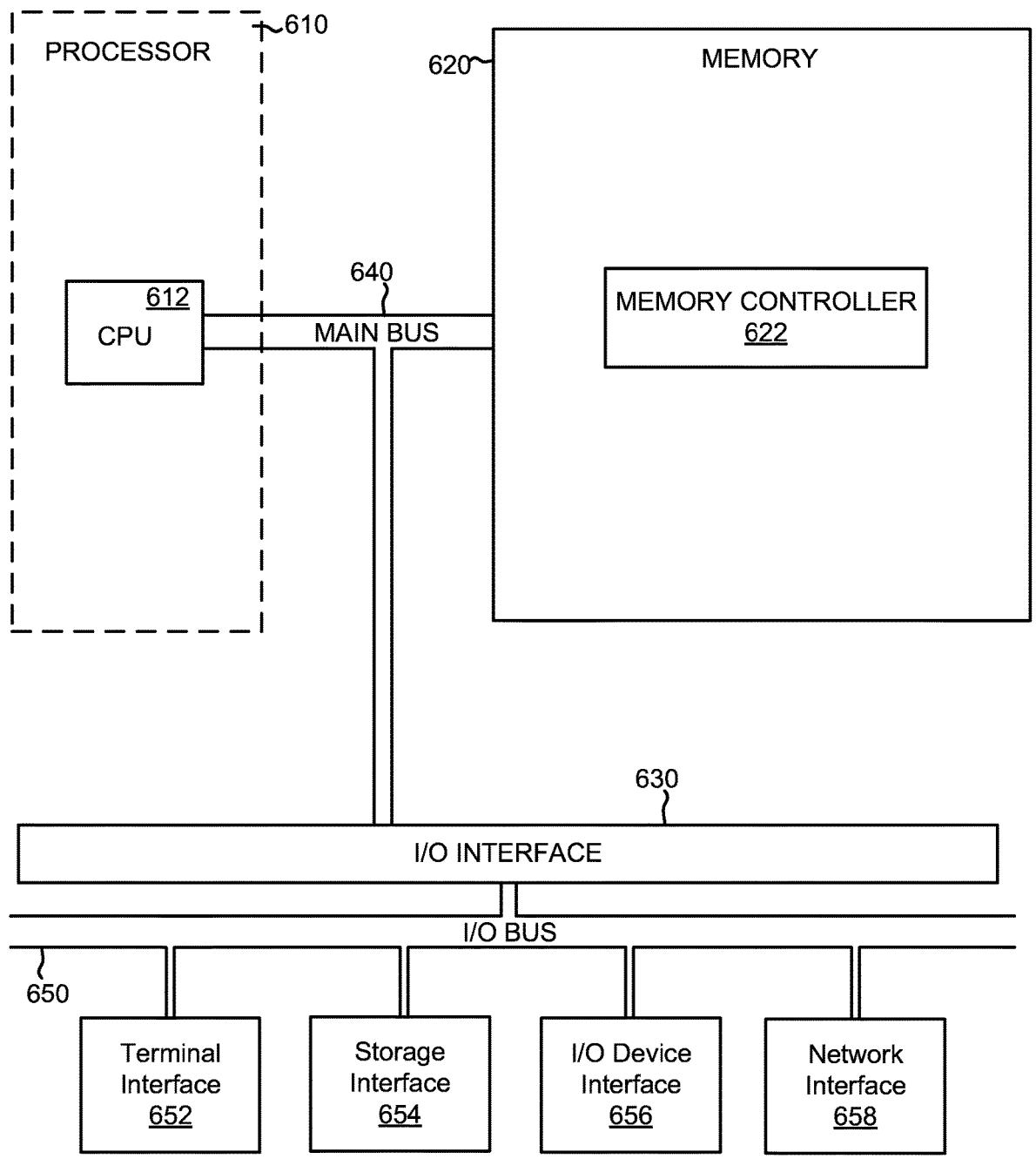
FIG. 6 depicts an embodiment of a representative computer system.

FIG. 6 depicts an example of the representative major components of a Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the memory. The CPU 612 may be comprised of one or more circuits configured to perform one or more methods consistent with embodiments of the present disclosure. In some embodiments, the Computer System 601 may contain multiple Processors 610 typical of a relatively large system. In other embodiments, however, the Computer System 601 may be a single Processor 610 with a singular CPU 612.

The Memory 620 of the Computer System 601 may be comprised of a Memory Controller 622 and one or more memory modules for temporarily or permanently storing data. In some embodiments, the Memory 620 may comprise a random-access semiconductor memory, storage device, or storage medium (either volatile or non-volatile) for storing data and programs. The Memory Controller 622 may communicate with the Processor 610, facilitating storage and retrieval of information in the Memory 620. The Memory Controller 622 may communicate with the I/O Interface 630, facilitating storage and retrieval of input or output in the Memory 620. In some embodiments, the Memory 620 may contain dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O device Interface 656, and the Network Interface 658.

In some embodiments Memory 620 may contain, or Storage Interface 654 may interface with a storage device that contains, data that may be read by the Processor 610 when interpreting actions by monitored persons. This data may include graphical information of previously recognized faces, a database of known pronounced words, speech patterns of frequent event participants or monitored persons, data relating to known gestures, and more. In some embodiments I/O device Interface 656 may interface with a monitoring device, a video-recording device, or both. Further, in embodiments in which Processor 610 is configured to project a video of the event to a projection screen or monitor, I/O device Interface 656 may interface with a video projector or monitor. In embodiments in which a video of an event is broadcast to remote viewers, Processor 610 may broadcast the video over Network Interface 658. Further, in embodiments in which the video is not immediately presented to indirect viewers, but is stored to be viewed later, Processor 610 may utilize Storage Interface 654 to communicate with a database, or similar storage, to store the video. In similar embodiments, Computer System 601 may be located on or within a monitoring device, video-recording device, video projector, or monitor.

In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the computer system 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C66 or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
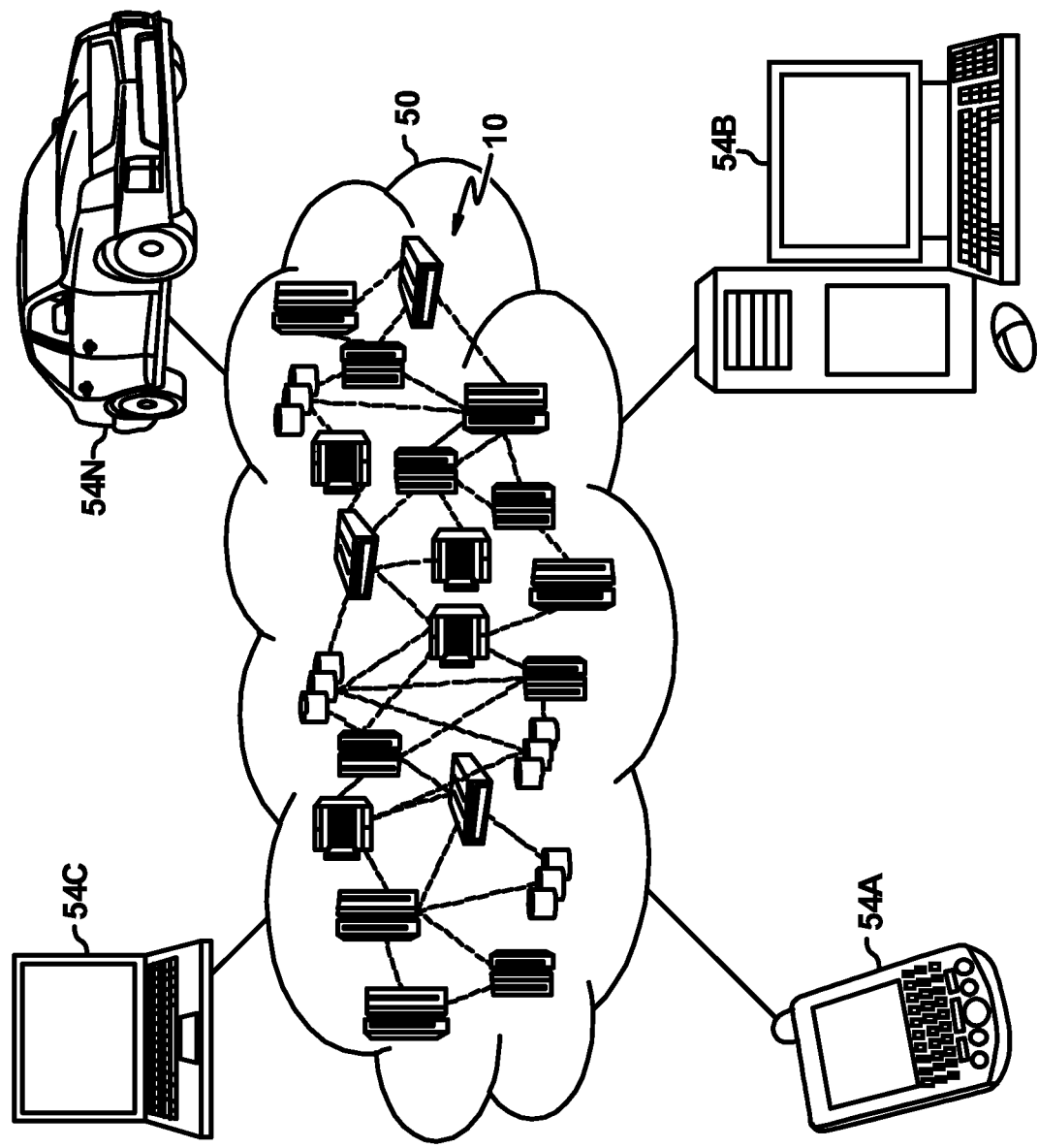
FIG. 7 depicts a cloud-computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
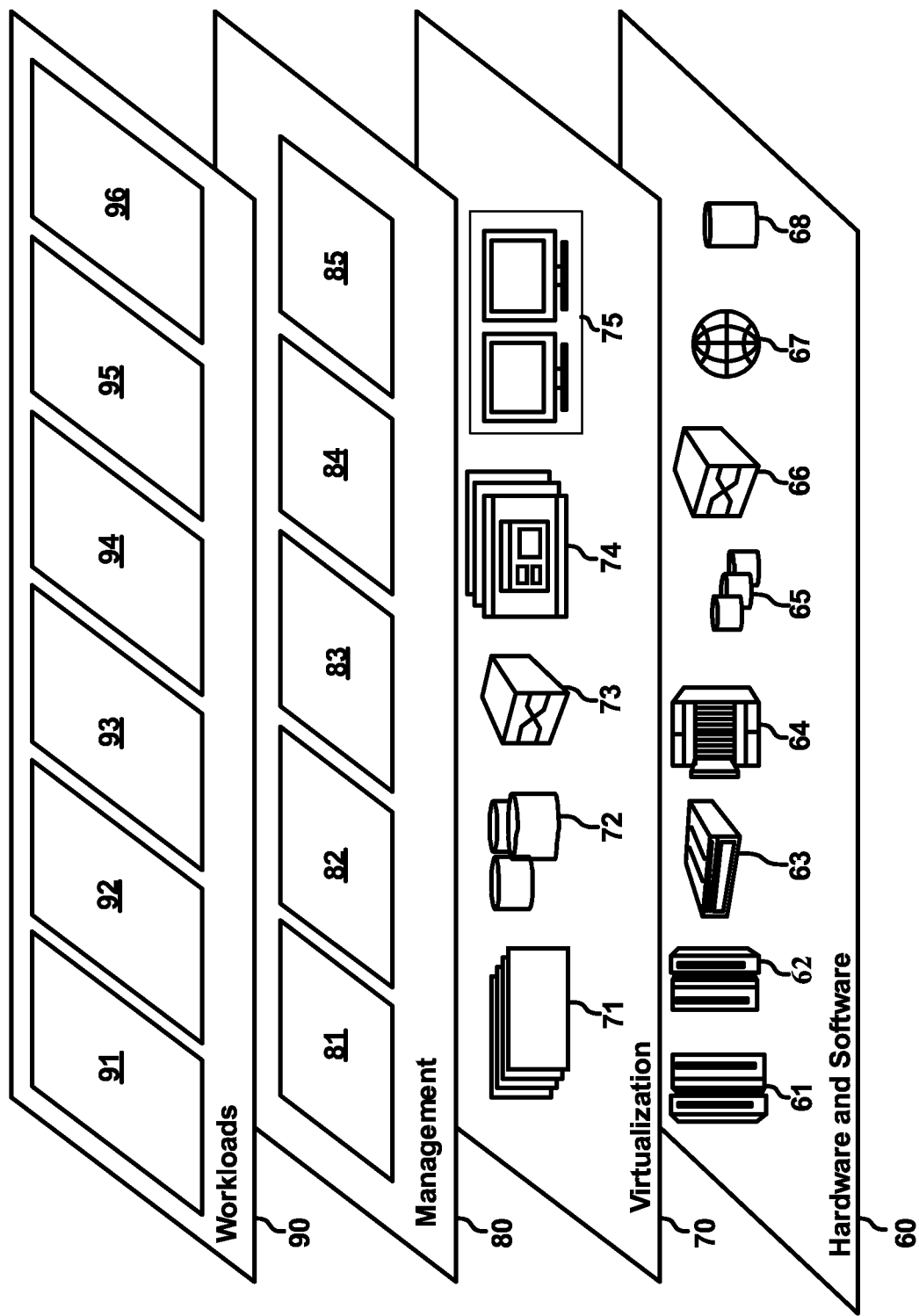
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions that may be provided from this layer include: mapping and navigation 91; software development and lifecycle management 92; virtual classroom education delivery 93; data analytics processing 94; transaction processing 95; and video processing and production 96.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   recording, by a processor, a first location at an event with at least one person;
   monitoring, by the processor, a plurality of actions of the at least one person at the first location;
   detecting, by the processor, that at least one action of the at least one person indicates a change of interest to a second location at the event, wherein the at least one action is not moving to the second location;
   identifying, by the processor, the second location at the event based on the at least one action; and
   recording, by the processor, the second location at the event, wherein the recording the second location comprises altering the focus within a video.

2. The method of claim 1, wherein the at least one person is recorded from a third location and the second location is recorded from a fourth location, and wherein the third location and the fourth location are not the same location.

3. The method of claim 1, further comprising interpreting, by the processor, a second action as indicating the second location with more precision than the at least one action alone.

4. The method of claim 3, wherein the at least one action is an oriented gesture and the second action is a vocalization.

5. The method of claim 4, wherein the oriented gesture comprises the at least one person pointing at one of several objects, and wherein the processor interprets the vocalization to determine which of the several objects was implied by the physical gesture.

6. The method of claim 3, wherein the second action comprises a second person directing his or her gaze towards the second location indicated by the at least one action.

7. The method of claim 3, wherein the second action is a non-human stimulus.

8. The method of claim 1, wherein the at least one person is an in-person participant of the event, wherein the monitoring the plurality of actions includes monitoring recordings of the plurality of actions, and wherein the at least one action serves to indicate that the second location is a location of interest to other participants of the event.

9. The method of claim 1, wherein the altering the focus of the video comprises adding the second location to the video.

10. A system comprising one or more computer processor circuits configured to perform a method comprising:
recording, by a processor a first location at an event with at least one person;
monitoring, by the processor, a plurality of actions of the at least one person at the first location;
detecting, by the processor, that at least one action of the at least one person indicates a change of interest to a second location at the event, wherein the at least one action serves to indicate that the second location is a location of interest to participants of the event;
identifying, by the processor, the second location at the event based on the at least one action; and
recording, by the processor, the second location at the event, wherein the recording the second location comprises altering the focus of a video.

11. The system of claim 10, further comprising establishing an angle and zoom level from which the second location is recorded on based on spatial attributes of the second location.

12. The system of claim 11, wherein the spatial attributes of the second location are determined prior to the monitoring.

13. The system of claim 10, further comprising monitoring, by the processor, actions of a second person.

14. The system of claim 13, wherein the at least one person and second person are members of an audience at an event, and wherein the actions of the at least one person and the second person are reactions to at least one stimulus at the second location.

15. The system of claim 10, wherein the at least one action comprises a vocalization.

16. A computer program product, the computer program product comprising a computer readable storage medium having program instructions embodied therewith, the program instructions executable by a computer to cause the computer to:
record, by a processor, a first image, obtained by a first video-recording device, of a first location at an event with at least one person;
monitor, by the processor, a plurality of actions of the at least one person at the first location;
interpret, by the processor, at least one action of the at least one person that indicates a change of interest to a second location at the event, wherein the at least one person is not at the second location;
determine, by the processor, the second location at the event based on the at least one action of the at least one person;
record, by the processor, a second image, obtained by a second video-recording device, of a third location at the event;
monitor, by the processor, a second plurality of actions of a second person at the third location;
interpret, by the processor, at least one action of the second person as indicating the second location with more precision than the at least one action of the at least one person alone, wherein the at least one action of the second person comprises the second person directing his or her gaze towards the second location indicated by the at least one action of the at least one person; and
record, by the processor, a third image of the second location at the event wherein the recording the second location comprises altering the focus of a video.

17. The computer program product of claim 16, wherein the second location is determined based on the at least one action of the at least one person by analyzing whether the at least one action implies that the second location is likely to be a location of interest to an indirect viewer.

18. The computer program product of claim 16, wherein the at least one action of the at least one person comprises the at least one person directing his or her gaze towards the second location.

19. The computer program product of claim 16, wherein the at least one action of the at least one person comprises an oriented gesture, and wherein the program instructions are executable by the computer to further cause the computer to:
establish, by the processor, a first and second reference point, wherein a line on which both the first and second reference points are located represents the estimated direction of the oriented gesture;
establish, by the processor, an area centered around the line within which to detect potential objects of interest; and
identify, by the processor, a potential object of interest within the area, wherein the potential object of interest is at the second location.

20. The computer program product of claim 19, wherein the area is a three-dimensional cone.

* * * * *